United States Patent [19]
Iwanishi et al.

[11] Patent Number: 6,038,397
[45] Date of Patent: Mar. 14, 2000

[54] SYSTEM FOR ALLOCATING THE MEMORY AREA OF SECOND DATA WHICH VALUE NEED NOT BE PRESERVED TO ANOTHER DATA OF SOME OF THE PROCESSES

[75] Inventors: Nobufusa Iwanishi; Katsuyuki Kaneko, both of Osaka, Japan

[73] Assignee: Matsushita Electric Industrial Co., Ltd., Osaka, Japan

[21] Appl. No.: 08/444,886

[22] Filed: May 19, 1995

[30] Foreign Application Priority Data

May 20, 1994 [JP] Japan .................................. 6-106572

[51] Int. Cl.⁷ ...................................................... G06F 9/45
[52] U.S. Cl. .......................... 395/709; 395/702; 395/706
[58] Field of Search ................................. 395/702, 704, 395/706, 709

[56] References Cited

U.S. PATENT DOCUMENTS

| | | | |
|---|---|---|---|
| 4,763,255 | 8/1988 | Hopkins et al. ......................... | 395/709 |
| 5,088,034 | 2/1992 | Ihara et al. .............................. | 395/706 |
| 5,280,617 | 1/1994 | brender et al. ........................... | 395/700 |
| 5,301,327 | 4/1994 | McKeeman et al. ..................... | 395/700 |
| 5,317,743 | 5/1994 | Imai et al. ................................ | 395/700 |
| 5,339,428 | 8/1994 | Burmeister et al. ...................... | 395/700 |
| 5,355,494 | 10/1994 | Sistare et al. ............................ | 395/706 |
| 5,404,531 | 4/1995 | Wakatani .................................. | 395/375 |
| 5,418,965 | 5/1995 | Mahar ...................................... | 395/700 |
| 5,535,392 | 7/1996 | Brett ......................................... | 395/700 |

FOREIGN PATENT DOCUMENTS 5-257704 10/1993 Japan .

*Primary Examiner*—Thomas C. Lee
*Assistant Examiner*—Anderson I. Chen
*Attorney, Agent, or Firm*—McDermott, Will & Emery

[57] ABSTRACT

A compiling method comprises the steps of analyzing the characters and phrases in the source code of a program, analyzing the syntax of the program, and analyzing the meaning of the program, a program division step of dividing the program into a plurality of processes, a data reference analysis step of analyzing the data reference relations among the individual processes obtained through the division of the program and extracting first data used only in one process of the program and second data the value of which need not be preserved in some processes of the program, a memory area allocation step of allocating the memory area for the above first data to another data in any process in which the above first data is not used and allocating the memory area for the above second data to another data in some processes in which the value of the above second data need not be preserved, and the step of generating and outputting the object code of the program.

6 Claims, 16 Drawing Sheets

FIG. 2

PROGRAM AAA
10:CONTINUE

```
A = ···
V = ···V···
··· = ···X···
··· = ···Y···A···
··· ··· ···
```
PROCESS a1

```
B = ···
··· = ···V···
W = ···W···B···
··· ··· ···
```
PROCESS a2

```
C = ···
··· = ···W···
X = ···X···C···
··· ··· ···
```
PROCESS a3

```
D = ···
··· = ···V···
Y = ···Y···D···
··· ··· ···
```
PROCESS a4

IF(···) GOTO 10
STOP
END

FIG. 3

| | PROCESS a1 | PROCESS a2 | PROCESS a3 | PROCESS a4 |
|---|---|---|---|---|
| VARIABLE A | ASSIGN/REFER TO | | | |
| VARIABLE B | | ASSIGN/REFER TO | | |
| VARIABLE C | | | ASSIGN/REFER TO | |
| VARIABLE D | | REFER TO | | ASSIGN/REFER TO |
| VARIABLE V | ASSIGN/REFER TO | | | REFER TO |
| VARIABLE W | | ASSIGN/REFER TO | REFER TO | |
| VARIABLE X | REFER TO | | ASSIGN/REFER TO | |
| VARIABLE Y | REFER TO | | | ASSIGN/REFER TO |

FIG. 4

| | PROCESS a1 | PROCESS a2 | PROCESS a3 | PROCESS a4 |
|---|---|---|---|---|
| VARIABLE A/B/C/D | A:ASSIGN/REFER TO | B:ASSIGN/REFER TO | C:ASSIGN/REFER TO | D:ASSIGN/REFER TO |
| VARIABLE V | ASSIGN/REFER TO | REFER TO | | REFER TO |
| VARIABLE W/Y | Y:REFER TO | W:ASSIGN/REFER TO | W:REFER TO | Y:ASSIGN/REFER TO |
| VARIABLE X | REFER TO | | ASSIGN/REFER TO | |

F I G.5
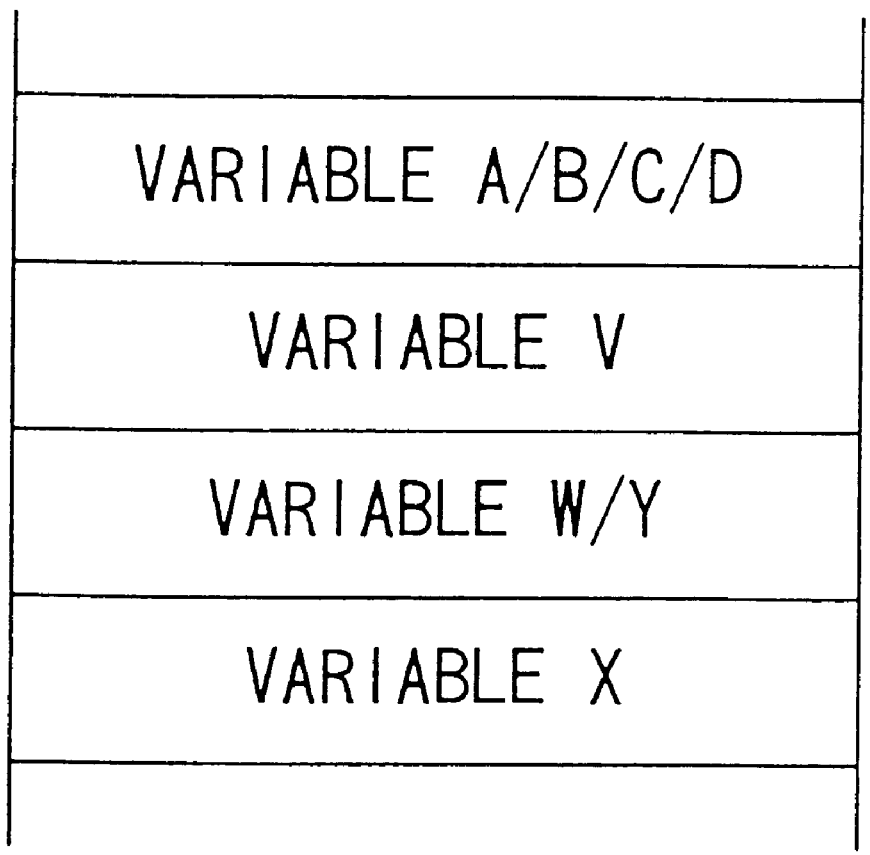

FIG. 8

| | OPERATION 1 | TRANSFER 1 | OPERATION 2 | TRANSFER 2 | OPERATION 3 | TRANSFER 3 | OPERATION 4 |
|---|---|---|---|---|---|---|---|
| Ax | ASSIGN/REFER TO Ax | REFER TO Ax | | | | ASSIGN TO Ax | REFER TO Ax |
| Ay | | ASSIGN TO Ay | ASSIGN/REFER TO Ay | REFER TO Ay | | ASSIGN TO Ay | REFER TO Ay |
| Az | | | | ASSIGN TO Az | ASSIGN/REFER TO Az | REFER TO Az | REFER TO Az |
| X-DIRECTION WORK | CALCULATE Ax | | | | | | |
| Y-DIRECTION WORK | | | CALCULATE Ay | | | | |
| Z-DIRECTION WORK | | | | | CALCULATE Az | | |

FIG. 9

| | OPERATION 1 | TRANSFER 1 | OPERATION 2 | TRANSFER 2 | OPERATION 3 | TRANSFER 3 | OPERATION 4 |
|---|---|---|---|---|---|---|---|
| Ax | ASSIGN/REFER TO Ax | REFER TO Ax | | | | ASSIGN TO Ax | REFER TO Ax |
| Ay | | ASSIGN TO Ay | ASSIGN/REFER TO Ay | REFER TO Ay | | ASSIGN TO Ay | REFER TO Ay |
| Az | | | | ASSIGN TO Az | ASSIGN/REFER TO Az | REFER TO Az | REFER TO Az |
| WORK VARIABLE | CALCULATE Ax | | CALCULATE Ay | | CALCULATE Az | | |

FIG.10

| | OPERATION 1 | TRANSFER 1 | OPERATION 2 | TRANSFER 2 | OPERATION 3 | TRANSFER 3 | OPERATION 4 |
|---|---|---|---|---|---|---|---|
| Ax | ASSIGN/REFER TO Ax | REFER TO Ax | CALCULATE Ay | | CALCULATE Az | ASSIGN TO Ax | REFER TO Ax |
| Ay | CALCULATE Ax | ASSIGN TO Ay | ASSIGN/REFER TO Ay | REFER TO Ay | CALCULATE Az | ASSIGN TO Ay | REFER TO Ay |
| Az | CALCULATE Ax | | CALCULATE Ay | ASSIGN TO Az | ASSIGN/REFER TO Az | REFER TO Az | REFER TO Az |

FIG. 13
PRIOR ART

PROGRAM AAA
10:CONTINUE

```
A = ···
V = ··· V ···
··· = ··· X ···
··· = ··· Y ··· A ···
··· ··· ···
```
PROCESS z1

```
B = ···
··· = ··· V ···
W = ··· W ··· B ···
··· ··· ···
```
PROCESS z2

```
C = ···
··· = ··· W ···
X = ··· X ··· C ···
··· ··· ···
```
PROCESS z3

```
D = ···
··· = ··· V ···
Y = ··· Y ··· D ···
··· ··· ···
```
PROCESS z4

IF(···) GOTO 10
STOP
END

FIG.15
PRIOR ART

PROGRAM AAA
COMMON A, B, C, D
10:CONTINUE

```
A = ···
V = ···V···
··· = ···X···
··· = ···Y···A···
··· ··· ···
```
PROCESS z1

```
B = ···
··· = ···V···
W = ···W···B···
··· ··· ···
```
PROCESS z2

```
C = ···
··· = ···W···
X = ···X···C···
··· ··· ···
```
PROCESS z3

```
D = ···
··· = ···V···
Y = ···Y···D···
··· ··· ···
```
PROCESS z4

IF(···) GOTO 10
STOP
END

SYSTEM FOR ALLOCATING THE MEMORY AREA OF SECOND DATA WHICH VALUE NEED NOT BE PRESERVED TO ANOTHER DATA OF SOME OF THE PROCESSES

BACKGROUND OF THE INVENTION

The present invention relates to a compiling technique for generating an object code from the source code of a program. More particularly, it relates to a compiling technique for minimizing the memory capacity of a computer required to execute the program through the optimum allocation of memory areas to data used in the program.

As faster computers have been implemented in recent years, it has become possible to execute large calculation problems that had conventionally been difficult to execute. With the trend, there has been increasing demand for computers with larger memory capacities. Although the advancement of semiconductor technology and assembly technology has contributed to increase the memory capacity that can be implemented in a computer, there are limitations to these attempts to physically increase the memory capacity. To go beyond the limitations, there has been proposed and devised a method which uses the function of a programming language and an algorithm for calculation in order to save the memory capacity.

FIG. 13 shows, by way of example, a FORTRAN program the structure of which is typically shown in numerical calculations. In the program shown in FIG. 13, four processes z1 to z4 are repeatedly performed until a specified condition defined in a IF statement is satisfied. In the process z1, the variables A and V are assigned values and referred to, while the variables X and Y are referred to. Similarly in the process z2, the variables B and W are assigned values and referred to, while the variable V is referred to. In the process z3, the variables C and X are assigned values and referred to, while the variable W is referred to. In the process z4, the variables D and Y are assigned values and referred to, while the variable V is referred to. FIG. 14 shows a memory map in the case of executing the program shown in FIG. 13. Since the program uses the eight variables, it occupies areas for 8 words in the memory.

In the program shown in FIG. 13, it is possible to save the memory capacity in use through the following procedure. For example, a COMMON declaration as shown in FIG. 15 can be used, which is an instruction to allocate one memory area in common to any variables each of which is obviously used only in one process, i.e., the variables A, B, C, and D. FIG. 16 is a memory map in the case of executing the FORTRAN program shown in FIG. 15. By using the COMMON declaration, the same memory area is allocated to the four variables A, B, C, and D, thereby saving the memory capacity in use.

Thus, to reduce the memory capacity used by a program, the programmer has conventionally practiced a method of analyzing the data reference relations among individual processes and using a grammar peculiar to a programming language.

However, the conventional method has the following problems.

In the program shown in FIG. 13, the data reference relations among the individual processes are easy to analyze, since it has an extremely simple structure. However, a program used in practice has a more complicated structure so that it is difficult for the programmer to analyze the data reference relations. Therefore, the method in which the programmer specifies the use in common of memory areas by means of a COMMON declaration or the like is extremely inefficient in reducing the memory capacity. Moreover, the method does not necessarily enable the optimum allocation of the memory areas.

Although the method of reducing the memory capacity shown in FIG. 15 is for a single processor, it is more difficult to reduce the memory capacity of a parallel computer provided with a plurality of processors.

The parallel computer executes a program by dividing it into processes which are larger in number than the processors provided therein and performing data transfer between the processors. In this case, a large number of temporary variables are used to perform calculations in the individual processes obtained through the division of the program, data exchange therebetween, and data transfer between the processors. Furthermore, in the case of solving a partial differential equation by a repetitive method, several processes are often repeatedly performed using a value obtained in the preceding process, so that the data reference relations become extremely complicated. Accordingly, it becomes extremely difficult for the programmer to analyze the data reference relations, compared with the case in which a single processor is used. Therefore, the method in which the programmer specifies the use in common of memory areas is extremely inefficient in reducing the memory capacity and it does not necessarily enable the optimum allocation of the memory areas.

SUMMARY OF THE INVENTION

In view of the foregoing, an object of the present invention is to reduce the memory capacity used by a program through the optimum allocation of memory areas to data in a compiling process for converting the source code of the program to an object code, although the programmer does not specify the use in common of the memory areas.

To attain the above object, according to the present invention, a given program is divided into a plurality of processes and the data reference relations among the individual processes are analyzed, so that the memory areas are used in common by different data based on the result of analysis without interrupting the execution of the program.

Consequently, it becomes unnecessary for the programmer to analyze the data reference relations in the program, since the data reference relations are automatically analyzed in compiling. Moreover, the memory areas required to execute the program are reduced, so that the efficiency with which the memory of a computer is used can be significantly increased.

According to the present invention, in compiling a program to be executed on a parallel computer provided with a plurality of arithmetic elements each having a memory, the program is divided into a plurality of processes and the data reference relations among the individual processes and among the plurality of arithmetic elements are analyzed, so that the memory areas are used in common by different data based on the result of analysis without interrupting the execution of the program.

Consequently, the memory area required to execute the program is reduced in each of the arithmetic elements, so that the efficiency with which the memory of the parallel computer is used can be significantly increased.

According to the present invention, in compiling a program to be executed on a parallel computer provided with a plurality of arithmetic elements each having a memory and the functions of a plurality of virtual arithmetic elements, the program is divided into a plurality of processes and the data reference relations among the individual processes and among the plurality of virtual arithmetic elements are analyzed, so that the memory areas are used in common by different data based on the result of analysis without interrupting the execution of the program.

Consequently, the memory area required to execute the program is reduced in each of the virtual arithmetic elements, so that the efficiency with which the memory of the parallel computer with multitask function is used can be significantly increased.

BRIEF DESCRIPTION OF THE DRAWINGS

FIG. 2 is a view showing a FORTRAN program for illustrating a first embodiment of the present invention;

FIG. 3 is a data reference table in the first embodiment of the present invention;

FIG. 4 is a newly produced data reference table in the first embodiment of the present invention;

FIG. 5 is a memory map in the case where the compiling method according to the first embodiment of the present invention is practiced;

FIG. 8 is a data reference table in the second embodiment of the present invention;

FIG. 9 shows an example of a newly produced data reference table in the second embodiment of the present invention;

FIG. 10 shows another example of the newly produced data reference table in the second embodiment of the present invention;

FIG. 13 is a FORTRAN program for illustrating a prior art;

FIG. 15 is a FORTRAN program in the case where the memory capacity in use is to be reduced by means of a COMMON declaration.

DETAILED DESCRIPTION OF THE PREFERRED EMBODIMENTS (First Embodiment)

Figure 1:
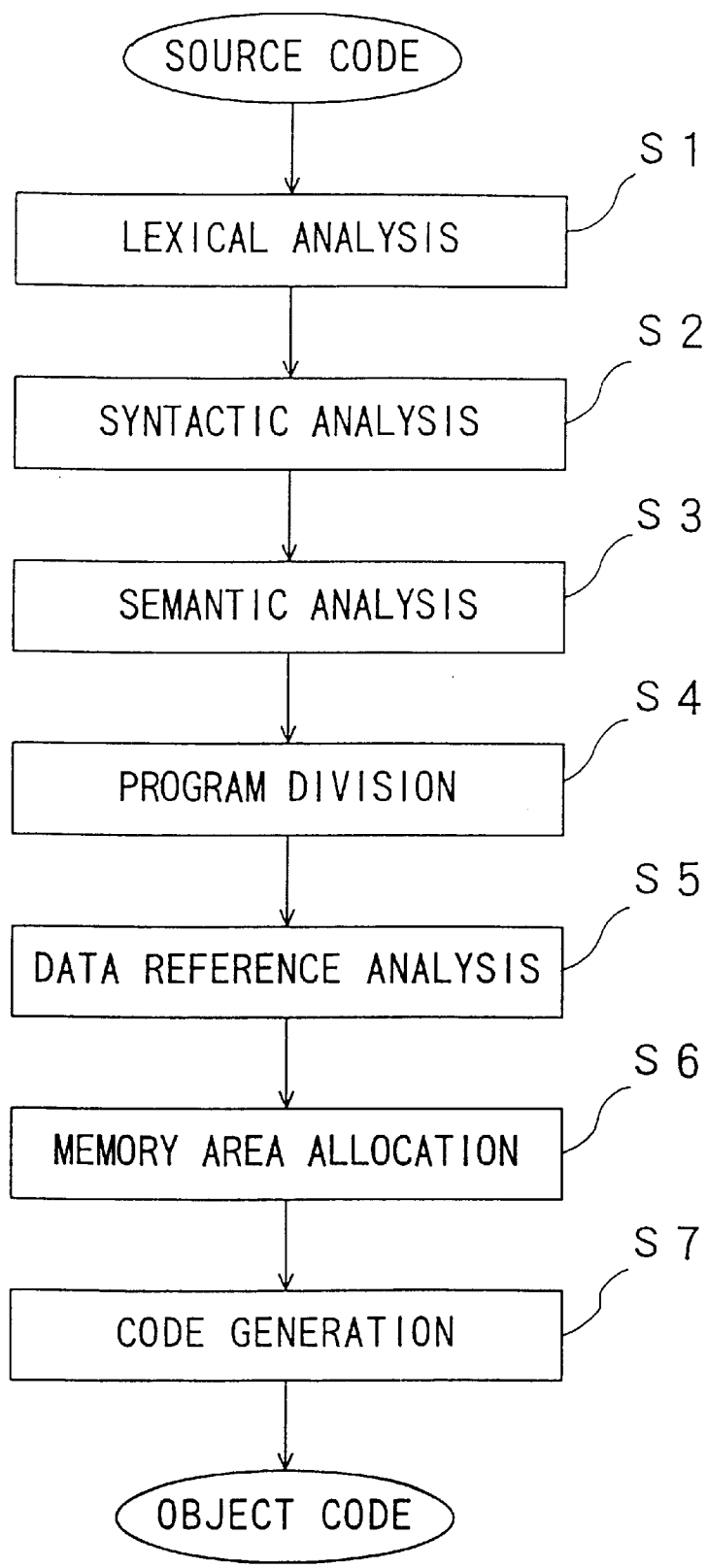
FIG. 1 is a flow chart of a compiling method according to the present invention.

FIG. 1 is a flow chart of a compiling method according to a first embodiment of the present invention.

A lexical analysis step S1 is for reading in the source code of a program described in a certain programming language, such as FORTRAN, and analyzing the characters and phrases in the source code. A syntactic analysis step S2 is for examining, based on the result of analysis in the lexical analysis step S1, whether or not the program is grammatically correct and analyzing the syntax of the program. A semantic analysis step S3 is for analyzing, based on the result of analysis in the syntactic analysis step S2, the meaning of the syntax of the program so as to obtain the overall flow of the program and extracting information including variables.

A program division step S4 is for dividing, based on the result of analysis of the semantic analysis step S3, the program into a plurality of processes.

A data reference analysis step S5 is for analyzing the data reference relations among the individual processes so as to produce a data reference table.

A memory area allocation step S6 is for extracting, based on the data reference table produced in the data reference analysis step S5, different data that can use memory areas in common so as to optimize the allocation of the memory areas and newly producing another data reference table.

A code generation step S7 is for generating an object code using the information obtained from the data reference table newly produced in the memory area allocation step S6.

FIG. 2 shows a FORTRAN program for illustrating the first embodiment of the present invention. Here, it is assumed that the lexical analysis step S1, the syntactic analysis step S2, and the semantic analysis S3 have already been performed in the compiling method shown in FIG. 1.

In the program division step S4, the program shown in FIG. 2 is divided into four processes a1 to a4 so that the data reference relations among the individual processes obtained through division become less close.

Next, in the data reference analysis step S5, the data reference relations among the individual processes are analyzed so as to produce a data reference table. FIG. 3 is a data reference table produced for the program shown in FIG. 2.

In FIG. 3, the first row, e.g., indicates that the variable A is assigned a value and referred to in the process a1 but it is not used in the other processes at all. The lowermost row indicates that the variable Y is only referred to in the process a1 and is assigned a value and referred to in the process a4. From the data reference table, it can be understood that the memory area for the variable A can be used for other purposes in the processes a2 to a4. Likewise, the memory area for the variable B can be used in common in the processes a1, a3, and a4; the memory area for the variable C can be used in common in the processes a1, a2, and a4; and the memory area for the variable D can be used in common in the processes a1 to a3. As for the variable V, it is assigned a value in the process a1 and then referred to in the processes a2 and a4, so that the memory area for the variable V cannot be used in common. The memory area for the variable W can be used in common in the processes a1 and a4; the memory area for the variable X can be used in common only in the process a2; and the memory area for the variable Y can be used in common in the processes a2 and a3.

Next, in the memory area allocation step S6, the memory areas are allocated to the individual variables based on the information obtained from the data reference table shown in FIG. 3, so as to minimize the memory areas in actual use. As a method of allocating the memory areas, the same technique as used in minimizing the number of tracks in a channel wiring installation region can be used extensively. In this case, the individual processes can be considered as cells, while the memory areas used for the variables in the individual processes can be considered as paths between the cells. As a result, a data reference table as shown in FIG. 4 is newly produced.

In FIG. 4, the first row indicates that the variables A, B, C, and D use one memory area in common, while the third row indicates that the variables W and Y use one memory area in common.

Finally, in the code generation step S7, the object code of the program is generated using the information obtained from a data reference table as shown in FIG. 4.

Eventually, the memory map of the data for the program shown in FIG. 2 becomes the memory map shown in FIG. 5. From the memory map shown in FIG. 5, it can be appreciated that, although the memory areas for 8 words have conventionally been required, the present embodiment requires reduced memory areas only for 4 words.

Thus, according to the present embodiment, the memory areas used by the program can be reduced by dividing the program into a plurality of subordinate processes and allocating the same memory area to the variables that can be used in common among the processes.

(Second Embodiment)

A compiling method according to a second embodiment of the present invention is practiced in accordance with the flow chart shown in FIG. 1, similarly to the first embodiment. The second embodiment is different from the first embodiment in that it is for a program to be executed on a distributed-memory-type parallel computer.

Figure 6:
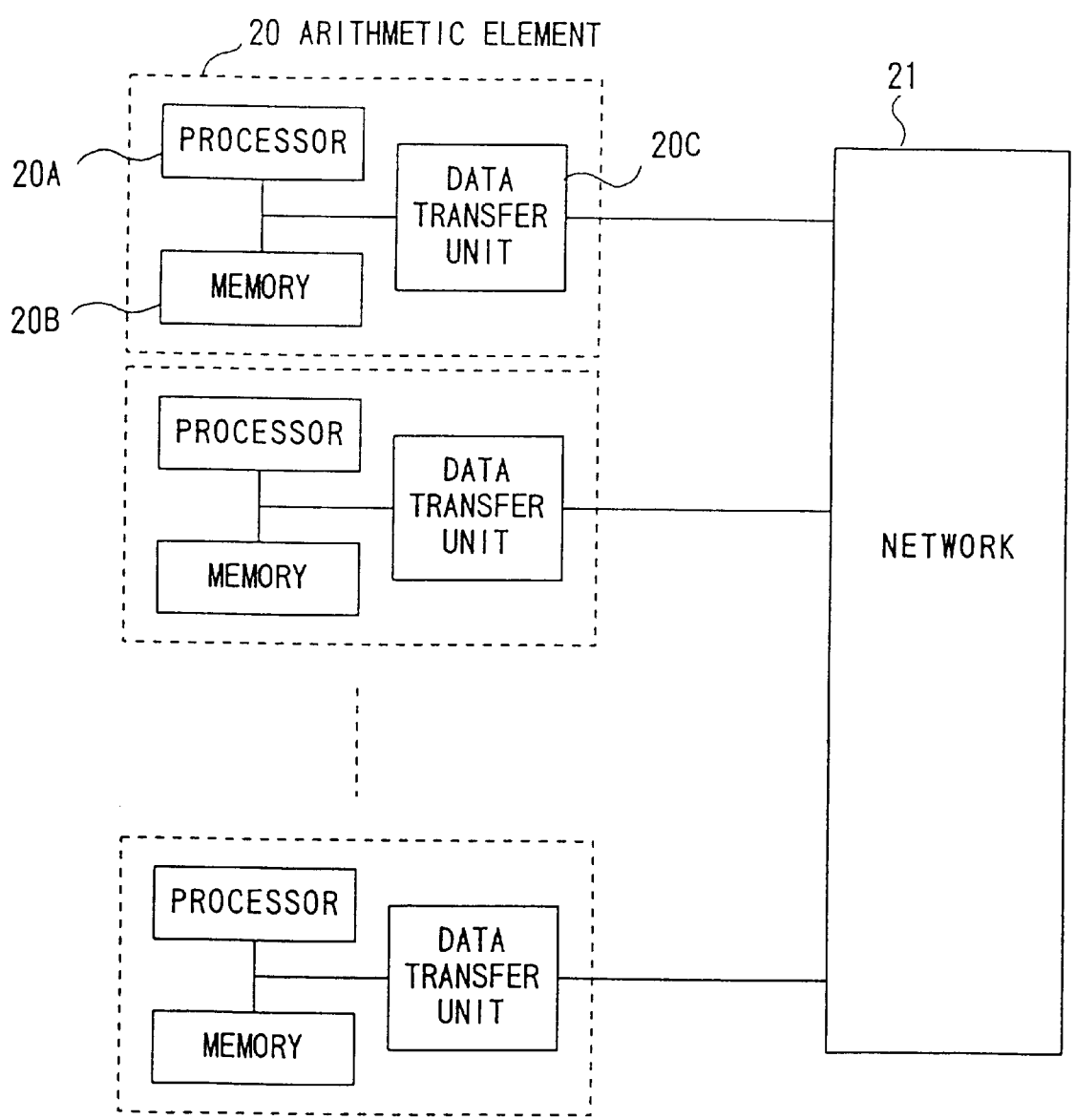
FIG. 6 is a view showing the structure of a distributed-memory-type parallel computer for illustrating a second embodiment of the present invention.

FIG. 6 is a view showing the structure of the distributed-memory-type parallel computer comprising a plurality of arithmetic elements 20, which are connected to each other via a network 21. Each of the arithmetic elements 20 consists of: a processor 20A; a memory 20B; and a data transfer unit 20C. The data transfer unit 20C has the function of exchanging data between the memories 20B provided in the respective arithmetic elements 20. Each of the arithmetic elements 20 alternately performs an operation in its own processor 20A and data transfer between the memory 20B in another arithmetic element 20 and its own memory 20B, thereby executing the program in overall synchronization. The parallel computer shown in FIG. 6 is used in the case of solving a three-dimensional numerical calculation problem by dividing it in different directions.

Figure 7:
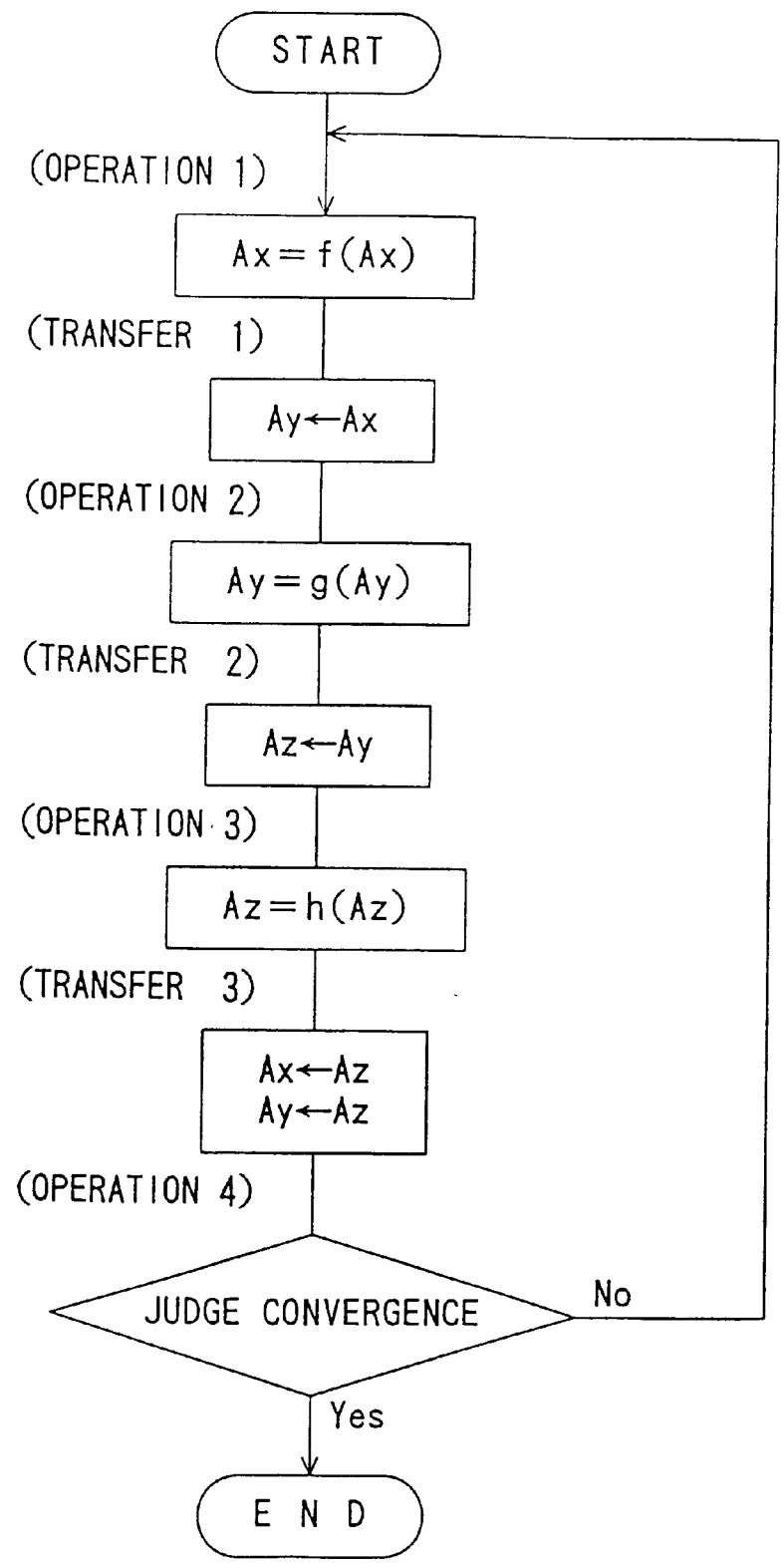
FIG. 7 is a flow chart typical of an ADI method for illustrating the second embodiment of the present invention.

FIG. 7 is a flow chart typical of the program to be executed by the parallel computer, which corresponds to the case where a three-dimensional partial differential equation, e.g., is repetitively solved in an ADI (alternate direction) method.

In FIG. 7, Ax, Ay, and Az are array variables for calculating the equation in x, y, and z directions, respectively, and f( ), g( ), and h( ) are functions representing specified processes using variables inside parentheses. The array variables Ax, Ay, and Az are distributed among the memories 20B of the plurality of arithmetic elements 20, so that the functions f, g, and h can be executed in parallel. Accordingly, the operations 1 to 3 can be performed independently in the individual arithmetic elements 20. Each of the transfers 1 to 3 is for replacing a certain array variable distributed among the plurality of memories 20B by another array variable distributed among the plurality of memories 20B via the network 21. The operation 4 is for comparing variables newly calculated in the operations 1 to 3 with Az and judging the presence or absence of convergence. If convergence is observed, the whole processing is completed. Conversely, if convergence is not observed, the foregoing processing is repeatedly performed.

A description will be given to the method of compiling the program based on the flow chart shown in FIG. 7 according to the present embodiment.

Initially, in the lexical analysis step S1 and syntactic analysis S2, the characters, phrases, and syntax are analyzed in accordance with the grammar of a programming language used on the parallel computer. Subsequently, in the semantic analysis step S3, the flow of operations in the individual arithmetic elements 29 is analyzed, while the data transfer between the arithmetic elements 20 and synchronous processing for the individual arithmetic elements 20 are recognized.

In the program division step S4, based on the result of analysis in the semantic analysis step S3, the program is divided into a plurality of processes so that either an operation in the arithmetic element 20 or data transfer between the arithmetic elements 20 is performed in each of the processes. Here, the program is divided into the operations 1 to 4 independently performed in the individual elements 20 and the transfers 1 to 3 performed between the operations.

Next, in the data reference analysis step S5, the data reference relations among the individual processes are analyzed so as to produce a data reference table. FIG. 8 is a data reference table produced based on the program in accordance with the flow chart shown in FIG. 7.

In FIG. 8, the first row, e.g., indicates that the array variable Ax distributed among the individual arithmetic elements 20 is: assigned a value and referred to in the operation 1; referred to in the transfer 1; assigned a value in the transfer 3; and referred to in the operation 4. The lowermost row indicates that the work area for calculating the variable Az is used only in the operation 3.

Next, in the memory area allocation step S6, memory areas are allocated based on the information obtained from the data reference table shown in FIG. 8 so that the memory areas in actual use is minimized. Since it can be understood from FIG. 8 that the x-direction, y-direction, and z-direction work areas can be used in common, the same memory area is allocated to these work areas. As a result, a data reference table as shown in FIG. 9 is produced.

Figure 11:
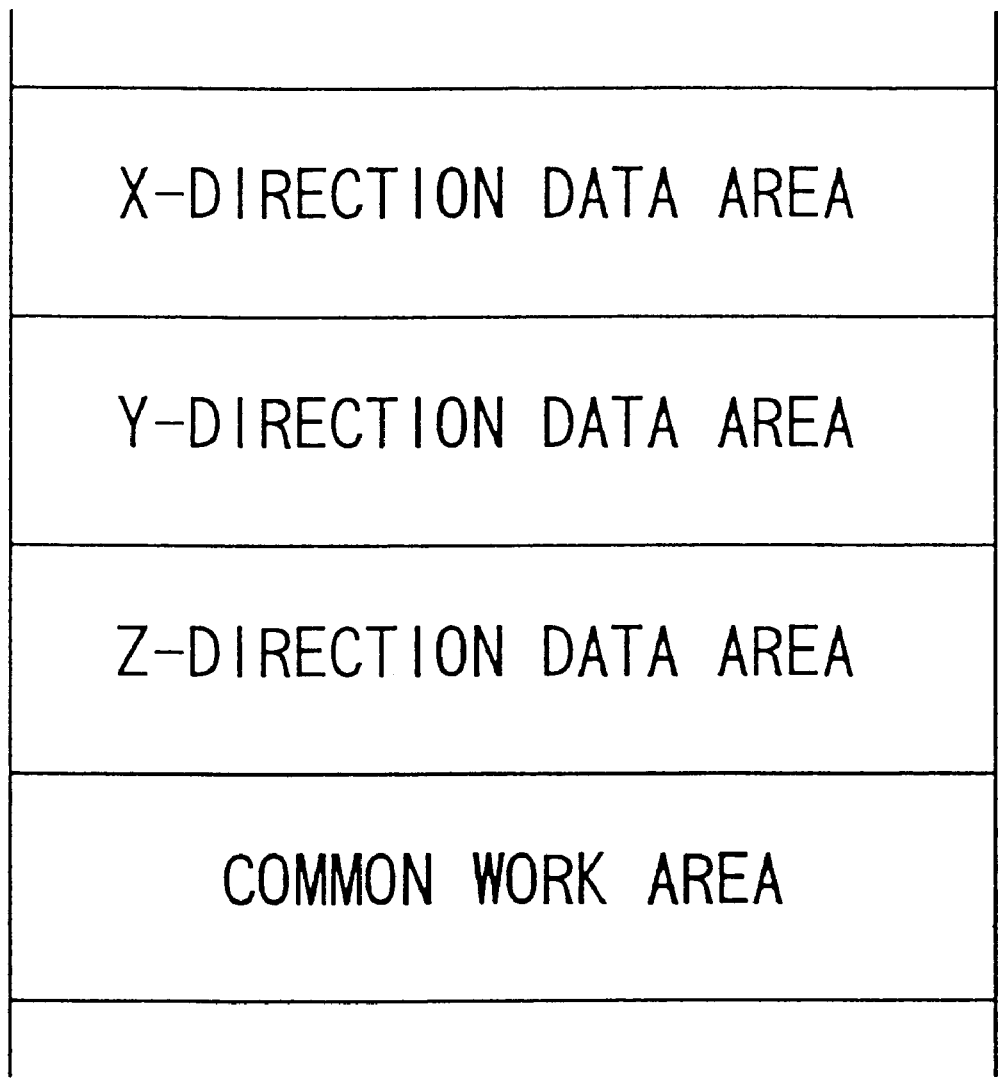
FIG. 11 is a memory map in accordance with the newly produced data reference table shown in FIG. 9 in the case where the compiling method according to the second embodiment of the present invention is practiced.

Finally, in the code generation step S7, the object code of the program is generated using the information obtained from the newly produced data reference table shown in FIG. 9. As a result, the memory map in the flow chart shown in FIG. 7 becomes the memory map shown in FIG. 11, so that the work areas are reduced to ⅓.

In the memory area allocation step S6, it is also possible to extract the following information from the data reference table shown in FIG. 8. That is, the memory area for the array variable Ax is not used in the operations 2 and 3. Likewise, the memory area for the array variable Ay is not used in the operations 1 and 3, while the memory area for the array variable Az is not used in the operations 1 and 2. On the other hand, since the x-direction, y-direction, and z-direction work areas are required only in the operations 1, 2, and 3, these areas can also be used as the memory areas for the array variables Ax, Ay, and Az. Accordingly, a data reference table as shown in FIG. 10 is newly produced in this case.

Figure 12:
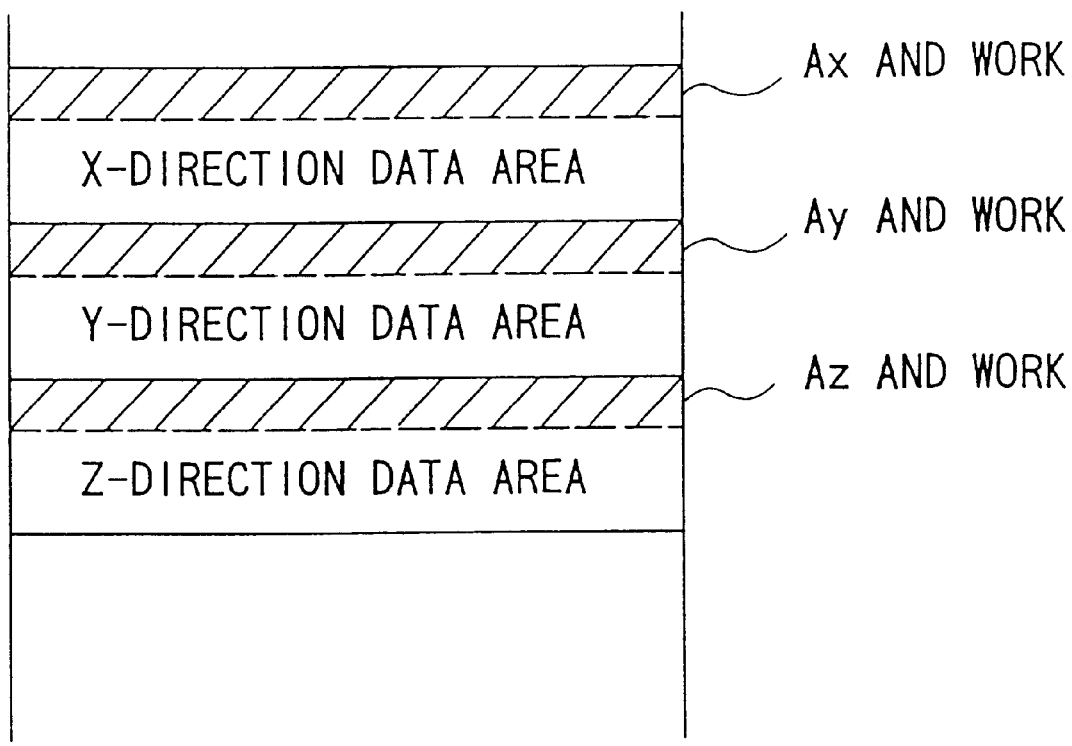
FIG. 12 is a memory map in accordance with the newly produced data reference table shown in FIG. 10 in the case where the compiling method according to the second embodiment of the present invention is practiced.
Figure 14:
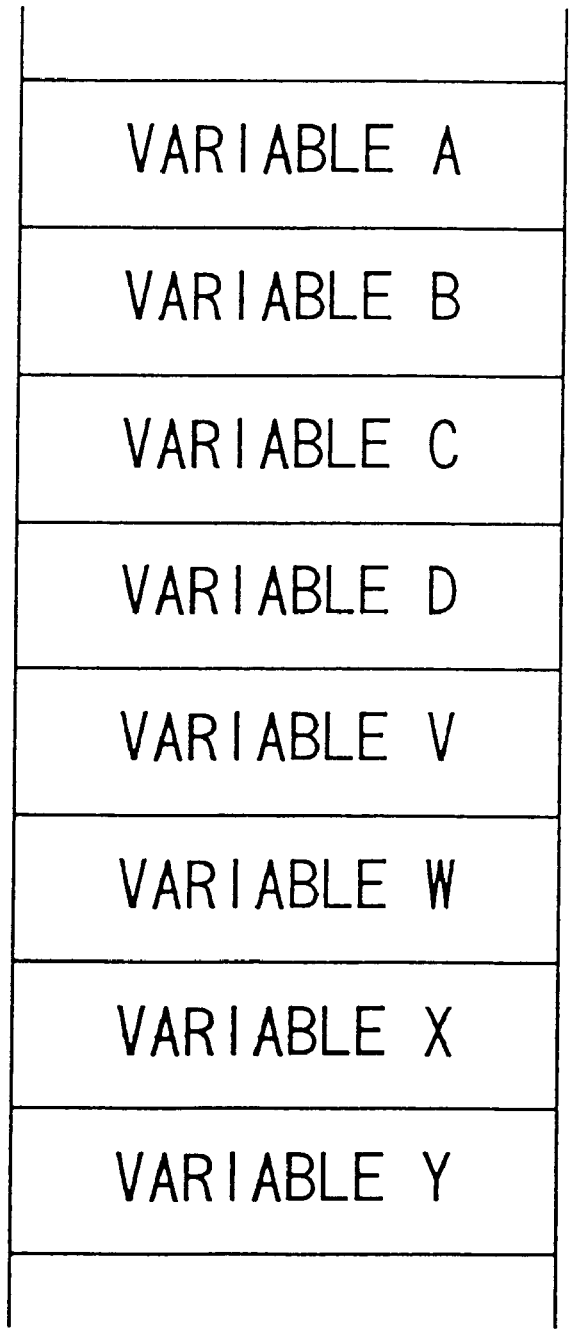
FIG. 14 is a memory map when the program shown in FIG. 13 is executed.
Figure 16:
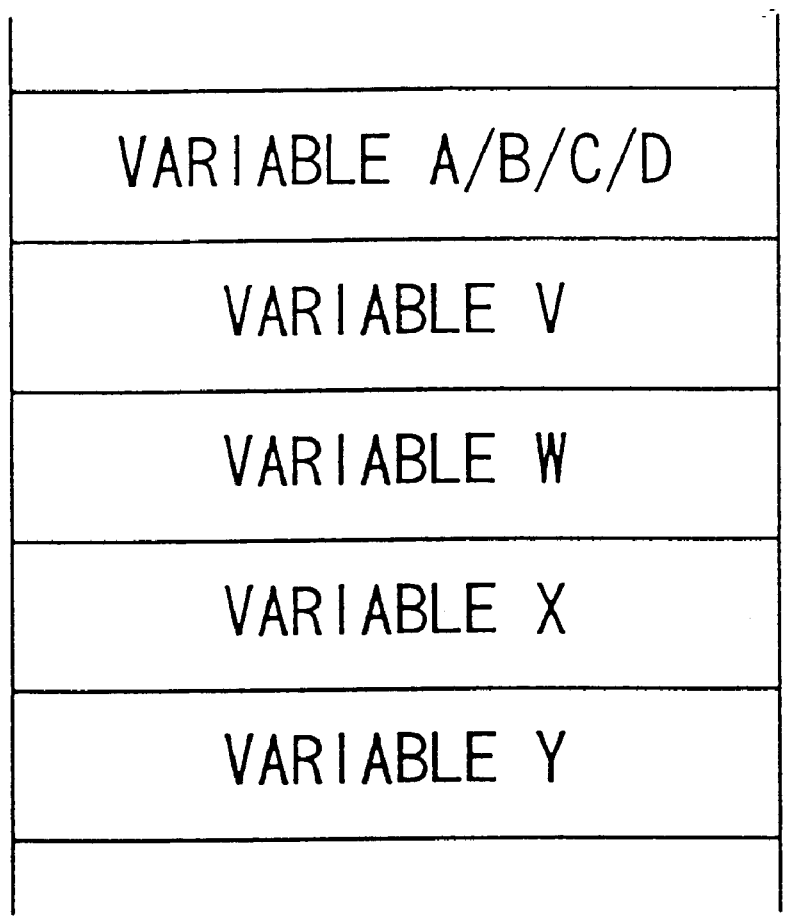
FIG. 16 is a memory map when the program shown in FIG. 15 is executed.

When the object code of the program was generated using the information obtained from the newly produced data reference table shown in FIG. 10, the memory map in the flow chart shown in FIG. 7 becomes the memory map shown in FIG. 12, so that the work areas are not required at all.

Thus, according to the present embodiment, the program to be executed on the parallel computer is divided into the plurality of operation processes and transfer processes so that the same memory area is allocated to the variables that can be used in common among the processes, thereby reducing the memory areas used by the program.

(Third Embodiment)

Many of the distributed-memory-type parallel computers as shown in FIG. 6 are provided with the arithmetic elements 20 each having multitask function. In other words, each of the arithmetic elements 20 can sequentially perform the functions of a plurality of virtual arithmetic elements. These parallel computers can execute a program as if it had a larger number of arithmetic elements than the arithmetic elements actually provided therein.

A third embodiment is for a program to be executed on a distributed-memory-type parallel computer in which each of the arithmetic elements has the multitask function. In the present embodiment is also executed the program in accordance with the flow chart shown in FIG. 1, similarly to the first and second embodiments.

In this case, between the functions of the plurality of virtual arithmetic elements provided in each of the actual arithmetic elements, the allocation of memory areas is performed, similarly to the method shown in the first embodiment. Between the actual arithmetic elements, the allocation of the memory areas is performed, similarly to the method shown in the second embodiment. With a combination of the two methods, an extremely large memory capacity can be saved.

Thus, according to the present embodiment, the memory areas used by the program can be reduced significantly on a distributed-memory-type parallel computer in which each of the arithmetic elements has the multitask function.

We claim:

1. A compiling method for converting the source code of a program to an object code, comprising:
   a lexical analysis step of analyzing the characters and phrases in said source code;
   a syntactic analysis step of analyzing the syntax of said program based on the result of analysis in said lexical analysis step;
   a semantic analysis step of analyzing the meaning of said program based on the result of analysis in said syntactic analysis step;
   a program division step of dividing said program into a plurality of processes based on the result of analysis in said semantic analysis step;
   a data reference analysis step of analyzing the data reference relations among the individual processes obtained through the division of the program in said program division step;
   a memory area allocation step of allocating memory areas to different data based on the data reference relations among the individual processes analyzed in said data reference analysis step; and
   a code generation step of generating the object code of said program based on the allocation of the memory areas in said memory area allocation step, wherein
   said data reference analysis step has the step of extracting first data used only in one of the plurality of processes obtained through the division of the program and second data the value of which need not be preserved in some of the plurality of processes obtained through the division of the program and
   said memory area allocation step has the step of allocating the memory area, which has been allocated to said first data, to another data in any of the processes in which said first data is not used and allocating the memory area, which has been allocated to said second data, to another data in some of the processes in which the value of said second data need not be preserved.

2. A compiling method for converting, to an object code, the source code of a program to be executed on a parallel computer comprising a plurality of arithmetic elements each having a memory, comprising:
   a lexical analysis step of analyzing the characters and phrases in said source code;
   a syntactic analysis step of analyzing the syntax of said program based on the result of analysis in said lexical analysis step;
   a semantic analysis step of analyzing the meaning of said program based on the result of analysis in said syntactic analysis step;
   a program division step of dividing, based on the result of analysis in said semantic analysis step, said program into a plurality of processes to be executed by said plurality of arithmetic elements in synchronization;
   a data reference analysis step of analyzing the data reference relations among the individual processes obtained through the division of the program in said program division step and among the individual arithmetic elements;
   a memory area allocation step of allocating the memory areas of the individual arithmetic elements to different data based on the data reference relations among the individual processes and among the individual arithmetic elements analyzed in said data reference analysis step; and
   a code generation step of generating the object code of said program based on the allocation of the memory areas in said memory area allocation step, wherein
   said data reference analysis step has the step of extracting first data used only in one of the plurality of processes obtained through the division of the program and only for one of the arithmetic elements and second data the value of which need not be preserved for any of the arithmetic elements in some of the plurality of processes obtained through the division of the program and
   said memory area allocation step has the step of allocating, for each of the arithmetic elements, the memory area, which has been allocated to said first data, to another data in any of the processes in which said first data is not used and allocating, for each of the arithmetic elements, the memory area, which has been allocated to said second data, to another data in some of the processes in which the value of said second data need not be preserved for any of the arithmetic elements.

3. A compiling method for converting, to an object code, the source code of a program to be executed on a parallel computer comprising a plurality of arithmetic elements each having a memory and the functions of a plurality of virtual arithmetic elements, comprising:
   a lexical analysis step of analyzing the characters and phrases in said source code;
   a syntactic analysis step of analyzing the syntax of said program based on the result of analysis in said lexical analysis step;
   a semantic analysis step of analyzing the meaning of said program based on the result of analysis in said syntactic analysis step;
   a program division step of dividing, based on the result of analysis in said semantic analysis step, said program into a plurality of processes to be executed by said plurality of virtual arithmetic elements in synchronization;
   a data reference analysis step of analyzing the data reference relations among the individual processes obtained through the division of the program in said program division step and among the individual virtual arithmetic elements;

a memory area allocation step of allocating the memory areas of the individual arithmetic elements to different data based on the data reference relations among the individual processes and among the individual virtual arithmetic elements analyzed in said data reference analysis step; and a code generation step of generating the object code of said program based on the allocation of the memory areas in said memory area allocation step, wherein said data reference analysis step has the step of extracting first data used only in one of the plurality of processes obtained through the division of the program and only for one of the virtual arithmetic elements and second data the value of which need not be preserved for any of the virtual arithmetic elements in some of the plurality of processes obtained through the division of the program and said memory area allocation step has the step of allocating, for each of the virtual arithmetic elements, the memory area, which has been allocated to said first data, to another data in any of the processes in which said first data is not used and allocating, for each of the virtual arithmetic elements, the memory area, which has been allocated to said second data, to another data in some of the processes in which the value of said second data need not be preserved for any of the virtual arithmetic elements.

4. A compiling apparatus for converting the source code of a program to an object code, comprising:

a lexical analysis means for analyzing the characters and phrases in the inputted source code;

a syntactic analysis means for analyzing the syntax of said program based on the result of analysis by said lexical analysis means;

a semantic analysis means for analyzing the meaning of said program based on the result of analysis by said syntactic analysis means;

a program dividing means for dividing said program into a plurality of processes based on the result of analysis by said semantic analysis means;

a data reference analysis means for analyzing the data reference relations among the individual processes obtained through the division of the program by said program dividing means;

a memory area allocating means for allocating memory areas to different data based on the data reference relations among the individual processes analyzed by said data reference analysis means; and a code generating means for generating the object code of said program based on the allocation of the memory areas by said memory area allocating means, wherein said data reference analysis means has the function of extracting first data used only in one of the plurality of processes obtained through the division of the program and second data the value of which need not be preserved in some of the plurality of processes obtained through the division of the program and said memory area allocating means has the function of allocating the memory area, which has been allocated to said first data, to another data in any of the processes in which said first data is not used and allocating the memory area, which has been allocated to said second data, to another data in some of the processes in which the value of said second data need not be preserved.

5. A compiling apparatus for converting, to an object code, the source code of a program to be executed on a parallel computer comprising a plurality of arithmetic elements each having a memory, comprising:

a lexical analysis means for analyzing the characters and phrases in the inputted source code;

a syntactic analysis means for analyzing the syntax of said program based on the result of analysis by said lexical analysis means;

a semantic analysis means for analyzing the meaning of said program based on the result of analysis by said syntactic analysis means;

a program dividing means for dividing, based on the result of analysis by said semantic analysis means, said program into a plurality of processes to be executed by said plurality of arithmetic elements in synchronization;

a data reference analysis means for analyzing the data reference relations among the individual processes obtained through the division of the program by said program dividing means and among the individual arithmetic elements;

a memory area allocating means for allocating the memory areas of the individual arithmetic elements to different data based on the data reference relations among the individual processes and among the individual arithmetic elements analyzed by said data reference analysis means; and a code generating means for generating the object code of said program based on the allocation of the memory areas by said memory area allocating means, wherein said data reference analysis means has the function of extracting first data used only in one of the plurality of processes obtained through the division of the program and only for one of the arithmetic elements and second data the value of which need not be preserved for any of the arithmetic elements in some of the plurality of processes obtained through the division of the program and said memory area allocating means has the function of allocating, for each of the arithmetic elements, the memory area, which has been allocated to said first data, to another data in any of the processes in which said first data is not used and allocating, for each of the arithmetic elements, the memory area, which has been allocated to said second data, to another data in some of the processes in which the value of said second data need not be preserved for any of the arithmetic elements.

6. A compiling apparatus for converting, to an object code, the source code of a program to be executed on a parallel computer comprising a plurality of arithmetic elements each having a memory and the functions of a plurality of virtual arithmetic elements, comprising:

a lexical analysis means for analyzing the characters and phrases in the inputted source code;

a syntactic analysis means for analyzing the syntax of said program based on the result of analysis by said lexical analysis means;

a semantic analysis means for analyzing the meaning of said program based on the result of analysis by said syntactic analysis means;

a program dividing means for dividing, based on the result of analysis by said semantic analysis means, said program into a plurality of processes to be executed by said plurality of virtual arithmetic elements in synchronization;

a data reference analysis means for analyzing the data reference relations among the individual processes obtained through the division of the program by said program dividing means and among the individual virtual arithmetic elements;

a memory area allocating means for allocating the memory areas of the individual arithmetic elements to different data based on the data reference relations among the individual processes and among the individual virtual arithmetic elements analyzed by said data reference analysis means; and a code generating means for generating the object code of said program based on the allocation of the memory areas by said memory area allocating means, wherein said data reference analysis means has the function of extracting first data used only in one of the plurality of processes obtained through the division of the program and only for one of the virtual arithmetic elements and second data the value of which need not be preserved for any of the virtual arithmetic elements in some of the plurality of processes obtained through the division of the program and said memory region allocating means has the function of allocating, for each of the virtual arithmetic elements, the memory area, which has been allocated to said first data, to another data in any of the processes in which said first data is not used and allocating, for each of the virtual arithmetic elements, the memory area, which has been allocated to said second data, to another data in some of the processes in which the value of said second data need not be preserved for any of the virtual arithmetic elements.

* * * * *